United States Patent [19]

Rougier

[11] 4,321,296

[45] Mar. 23, 1982

[54] GLAZING LAMINATES WITH INTEGRAL ELECTRICAL NETWORK

[75] Inventor: Gilles Rougier, Cerdon du Loiret, France

[73] Assignee: Saint-Gobain Industries, Neuilly-sur-Seine, France

[21] Appl. No.: 56,245

[22] Filed: Jul. 10, 1979

[30] Foreign Application Priority Data

Jul. 13, 1978 [FR] France ............... 78 20954

[51] Int. Cl.³ .................. B32B 7/02; B32B 15/02
[52] U.S. Cl. ................... 428/212; 219/203; 428/113; 428/216; 428/256; 428/423.3; 428/424.4; 428/424.7; 428/425.6; 428/412
[58] Field of Search ............. 219/203; 428/113, 212, 428/213, 256, 423–425, 216, 426, 432, 441, 442

[56] References Cited

U.S. PATENT DOCUMENTS

| | | |
|---|---|---|
| 3,718,535 | 2/1973 | Armstrong et al. ............. 219/203 |
| 3,888,711 | 6/1975 | Breitner ............. 219/203 |
| 3,947,618 | 3/1976 | Gruss ............. 219/203 |
| 4,057,671 | 11/1977 | Shoop ............. 219/203 |
| 4,073,986 | 2/1978 | Keslar et al. ............. 219/203 |
| 4,078,107 | 3/1978 | Bitterice et al. ............. 219/203 |

FOREIGN PATENT DOCUMENTS 2629779 5/1978 Fed. Rep. of Germany ...... 428/212

*Primary Examiner*—Bruce H. Hess
*Attorney, Agent, or Firm*—John T. Synnestvedt; Richard D. Weber

[57] ABSTRACT

A laminated glazing with electrical wires embedded in a thermoplastic interlayer is disclosed. The glazing is made of an interlayer of transparent or translucent thermoplastic material in which a network of electrical wires is embedded, the interlayer being in contact with a solid or laminated substrate containing at least one rigid sheet and with a layer of nonrigid plastic material, the thickness of which is usually less than one millimeter, this latter layer preferably being positioned on one of the surfaces of the glazing and preferably having self-healing and antilacerative properties. A prefabricated sheet containing the network of electrical wires can be used in the manufacture of the glazing. The wires can be of a relatively high resistance so that the glazing is heated when electrical current is passed through the wires or the wires can form part of an alarm system that signals breakage of the glazing.

9 Claims, 2 Drawing Figures

GLAZING LAMINATES WITH INTEGRAL ELECTRICAL NETWORK

FIELD OF THE INVENTION

The present invention relates to a laminated glazing with electrical wires embedded in a thermoplastic interlayer. The invention relates more specifically to a new laminated glazing configuration as well as to a new process for the manufacture of said glazing.

The invention further relates to a prefabricated sheet of plastic material containing a thermoplastic layer in which a network of one or more electrical wires is embedded, said prefabricated sheet being suitable for use in the manufacture of the above-mentioned laminated glazing. The invention also relates to a process for the manufacture of such a prefabricated sheet.

BACKGROUND OF THE INVENTION

Laminated glazings can be used as parts of alarm systems and, for this purpose, have fine electrical wires embedded in an interlayer of thermoplastic material which are connected to an electrical alarm device. If the glazing is broken, the resistance of the wires is altered, thereby activating the alarm device.

Such laminated glazings can also be used in another application, that of heated glazings. In this case, the wires embedded in the interlayer are connected to an electrical power source and the current passing through the wires raises the temperature of the glazing. Fogging of the glazing is avoided or eliminated and de-icing can be readily accomplished. Glazings with such built-in heating elements can be used, for instance, in air, sea and ground vehicles such as trains and automobiles. They are usually used in windshields or rear windows, primarily of automobiles.

The prior glazings usually have at least three transparent or translucent layers, i.e., an interlayer made of thermoplastic material and at least two rigid layers, one on each side of the interlayer. When the glazing consists of three layers, the wire network is embedded in the interlayer, which is usually made of polyvinylbutyral. This network comprises one or more fine metal wires that are parallel to each other. The wires are either rectilinear or, more often, sinusoidal. The latter arrangement has various advantages: it eliminates the phenomena of optical diffraction; it increases the length of the wire for a given distance; and it permits better heat dissipation.

The rigid layers covering the polyvinylbutyral can by sheets of glass or sheets of a plastic material such as polymethylmethacrylate. By covering the polyvinylbutyral, these layers protect it from external conditions, such as atmospheric conditions to which it is highly sensitive.

The rigid exterior layers have a thickness greater than one millimeter and often are two or three millimeters in thickness because of production and strength requirements and also because of the need for good optical qualities. Consequently, the above-mentioned laminted glazings with built-in heating or alarm elements weight a considerable amount. This weight constitutes a serious disadvantage, especially in the use of these glazings for automobiles. It is a well known fact that one of the major concerns of car manufacturers is reducing car weight in order to make them more economical and, by reducing the weight in the top portion of the car, to lower the center of gravity in order to make the car safer.

Another disadvantage related to the substantial thickness of the layers forming the known laminated glazings with built-in heating elements in the undue amount of time needed by the electrical heating resistance to heat the glazing surface sufficiently to de-ice it or defog it. This can also be called "heating inertia" and is due to the mass and poor thermal conductivity of the glass or plastic material used.

Furthermore, the considerable thickness of the layers requires that the resistance wires be raised to relatively high temperatures in order to produce adequate results.

SUMMARY OF THE INVENTION

The object of the invention is a new glazing, with a built-in heating or alarm element, that is lighter than those known to date. The invention also concerns a glazing with a built-in heating element with low heating inertia. It also concerns a glazing comprising a rigid substrate covered by a sheet of plastic material containing a network of resistance wires, the rigid substrate preferably being solid.

DESCRIPTION OF THE PREFERRED EMBODIMENT

Figure 1:
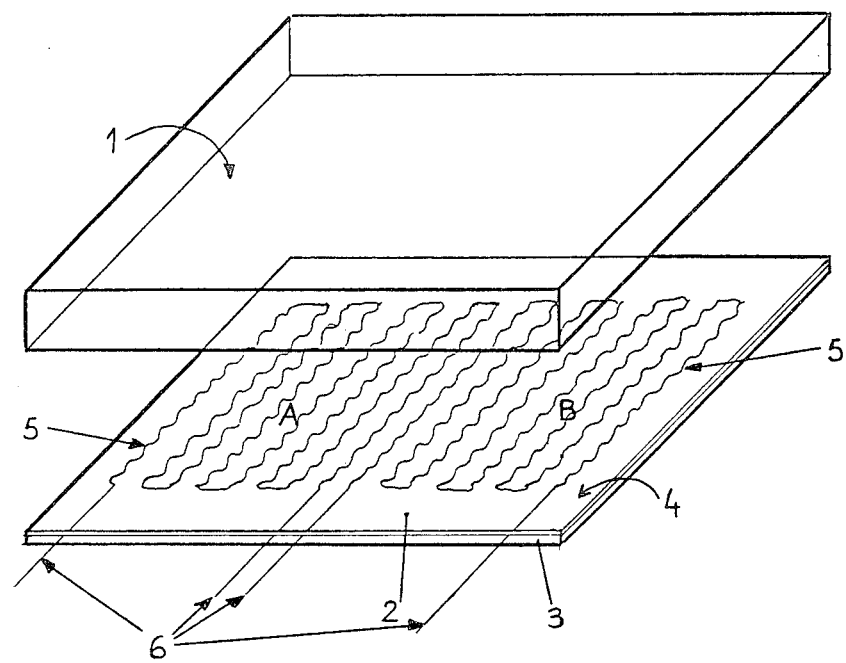
FIGS. 1 and 2 are examples of embodiments of laminated glazings with built-in heating or alarm elements, in accordance with the invention.

In accordance with the invention, the new glazing comprises an interlayer of transparent or translucent thermoplastic material in which a network of electrical wires is embedded, the interlayer being in contact, on the one hand, with a solid or laminated substrate having at least one rigid sheet and, on the other hand, in contact with a layer of nonrigid plastic material the thickness of which is usually less than one millimeter.

The layer of nonrigid plastic material preferably is a surface layer. Therefore, when the glazing is used as heated glazing for a vehicle, for example, this relatively thin surface layer is oriented toward the passenger compartment of the vehicle and, because it is thin, it can be heated almost instantaneously, thereby rapidly eliminating any condensation that may be on the interior surface of the glazing.

The nonrigid surface layer preferably comprises a plastic material having excellent self-healing properties, i.e., a material on the surface of which accidental scratches or local depressions disappear rapidly and, at the same time, a material with antilacerative properties; in other words, a material that does not tear, should the glazing break accidentally, and that coats the sharp edges of glass, thus preventing cuts and injuries to the passengers of the vehicle. A thermosetting polyurethane as described, for example, in French Pat. No. 2,251,608 can be used. Such a glazing offers excellent safety features.

The interlayer in which the network of fine metal wires is embedded is made of thermoplastic material to permit the embedding of the wires and to avoid optical defects. This layer can be in the form of a sheet of thermoplastic polymer or copolymer, such as a sheet of polyvinylbutyral, thermoplastic polyurethane, polycarbonate-urethane copolymer, etc. In addition to good optical properties, this sheet must also have good adhesive properties with respect to the glazing components surrounding it.

The interlayer preferably is not a single one-ply sheet, but is one ply of a multi-ply sheet formed from the interlayer and the nonrigid surface layer. This facilitates the making of the glazing as will be seen in the description given hereafter and makes it possible to produce a laminated glazing with improved optical qualities, for example, one having no air bubbles.

In a preferred configuration, the glazing comprises a rigid transparent solid substrate made of glass or of a plastic material such as polycarbonate, polymers or copolymers or acrylics and/or acrylonitriles, polyvinyl chloride, etc., covered on at least one surface by a sheet of plastic material having an exterior layer of a thermosetting polyurethane endowed with self-healing and anti-lacerative properties and an interior layer, bonded to the rigid substrate and containing the network of fine metal wires, made of a thermoplastic polymer, such as a thermoplastic polyurethane.

The above-mentioned sheet of plastic, in accordance with the invention, is formed, for example, from the sheet described in Belgian Pat. No. 856,398, a sheet in which the network of metal wires is embedded in the thermoplastic layer. This sheet may comprise a layer of a thermosetting polyurethane selected from those obtained from difunctional aliphatic isocyanates such as 1,6-hexanediisocyanate, 2,2,4-trimethyl-1,6-hexanediisocyanate, 2,4,4-trimethyl-1,6-hexanediisocyanante, 1,3-bis(isocyanatemethyl)benzene, bis(4-isocyanatecyclohexyl)methane, bis(3-methyl-4-isocyanatecyclohexyl) methane, 2,2-bis(4-isocyanatecyclohexyl)propane, and 3-isocyanatemethyl-3,5,5-trimethylcyclohexylisocyanate, as well as the biurets, isocyanurates and prepolymers of those compounds with a functionality of 3 or more and, on the other hand, from polyfunctional polyols such as branched polyols, namely, polyesterpolyols and polyetherpolyols obtained from the reaction of polyfunctional alcohols such as 1,2,3-propanetriol(glycerol), 2,2-bis(hydroxymethyl)-1-propanol(trimethylolethane), 2,2-bis(hydroxymethyl)-1-butanol(trimethylolpropane), 1,2,4-butanediol, 1,2,6-hexanetriol, 2,2-bis(hydroxymethyl)-1,3-propanediol(pentaerythritol), and 1,2,3,4,5,6-hexanehexol(sorbitol), with aliphatic diacids such as malonic, succinic, glutaric, adipic, suberic and sebacic acid, or with cyclic ethers such as ethylene oxide, 1,2-propylene oxide and tetrahydrofuran. The thermoplastic layer of the sheet may be a thermoplastic polyurethane selected from those obtained with monomers that form macromolecules with a linear side chain. For example, as diols, one can use aliphatic polyesters such as those formed from one or more diacids, such as malonic, succinic, glutaric, adipic, suberic or sebacic acid and from diols such as 1,2-ethanediol(ethylene glycol), 1,2-propanediol, 1,3-propanediol, 1,2-butanediol, 1,3-butanediol, 1,4-butanediol, 2,2-dimethyl-1,3-propanediol, diethylene glycol, triethylene glycol, polyethylene glycols, dipropylene glycol, tripropylene glycol, polypropylene glycol, or 2,2-bis(4-hydroxycyclohexyl)propane, possibly as a mixture. The thermoplastic layer may comprise thermoplastic polyurethanes prepared from linear polyethers obtained, for example, from ethylene oxide, 1,2-propylene acid and tetrahydrofuran. Polycarbonate diols can also be used.

Examples of difunctional aliphatic isocyanates that can be made to react with the above-mentioned diols in the formation of the thermoplastic polyurethane include 1,6-hexanediisocyanate, 2,2,4-trimethyl-1,6-hexanediisocyanate, 2,4,4-trimethyl-1-6-hexanediisocyanate, 1,3-bis (isocyanatemethyl)benzene, bis(4-isocyanatecyclohexyl)methane, bis(3-methyl-4-isocyanatecyclohexyl)methane, 2,2-bis(4-isocyanatecyclohexyl)propane, and 3-isocyanatemethyl-3,5,5,-trimethylcyclohexylisocyanate.

In the preferred embodiment, when the sheet is used in the manufacture of laminated glazing, the layer of thermoplastic material containing the network of wires has a thickness of 0.02 to 0.6 mm, whereas the self-healing, antilacerative exterior layer has a thickness of about 0.2 to 0.6 mm. The diameter of the embedded metal wire or other conductors or conductive filaments must be smaller than the thickness of the thermoplastic layer and wires 15 to 30 $\mu$m in diameter are usually used. These wires are generally embedded in the layer of thermoplastic material by means of heat and spaced about 0.5 to 3 mm, depending on the intended use. It is preferable to use wires made of tungsten, iron-nickel and copper.

The network of wires covering one surface of the glazing (a surface that will be referred to as "active surface area" and the size of which is determined by its intended use) is made up of one or more wire clusters. For example, the network may comprise a single wire when the active surface area is small. When the active surface area is larger, it may consist of two or three clusters, each cluster being made up of one wire. It may also comprise a series of wires arranged in a parallel pattern between two collector strips. The ends of the wire or the collector strips, whatever the case may be, are connected to a source of electrical energy outside the glazing. The electrical energy, the diameter of the wire, its length and the spacing between wires can readily be determined to obtain a specific power (expressed in watts per square decimeter) of about 2 $W/dm^2$ to 70 $W/dm^2$, depending on the intended use of the glazing. heated rear window or windshield or as a heated side window in an automobile, the specific power required fluctuates between about 3 and 8 $W/dm^2$. In marine vehicles, these heated glazings usually require a specific power of about 12 to 18 $W/dm^2$. In aircraft, the specific power required may be between about 18 and 70 $W/dm^2$.

The invention also relates to a process for the manufacture of the glazing described as well as to a process for the manufacture of the two-ply sheet of plastic material, one layer of which consists of thermoplastic material into which electrical wires are embedded, a sheet which is used, among other things, in the manufacture of said glazing.

In accordance with the invention, the process for making the sheet comprises the following steps:

fabricating a two-ply sheet of plastic, one ply being primarily of plastic material having selfhealing and antilacerative properties, the other ply being primarily a thermoplastic material; and arranging a network of metal wires on the ply of thermoplastic material.

The sheet of plastic material can be prepared as described in Belgian Pat. No. 856,398, for example, by casting a first layer of plastic material having self-healing and antilacerative properties, then by casting thereon a second layer of thermoplastic material with good adhesive properties. The casting head described in German DOS Pat. No. 2,614,596 can be used for this purpose.

The placement of the network of metal wires on the thermoplastic layer can be accomplished by various methods known to those skilled in the art. The wire can be arranged in a rectilinear pattern or in an approximately sinusoidal pattern. In the latter case, the method described, for example, in French Pat. No. 2,162,040 can be used whereby the final sinusoidal form is given to each wire immediately prior to being applied to the thermoplastic layer. The Therglas technique may also be used whereby a roughly sinusoidal path is cut into the thermoplastic layer with a heated needle and the conductor wire embedded therein.

When the electrical network comprises several metal wires arranged in a parallel pattern between two collector strips (also called busses), the two collector strips can be the first to be placed on the thermoplastic surface followed by the metal wires. The wires can be soldered to the strips, a procedure that is especially desirable when these wires are coated, for example, with a coating to diminish metal shine, and the initial two collector strips can be covered, if necessary, with two additional collector strips for improved wire contact. Such a network can be used when the thermoplastic layer is of sufficient thickness, for example, thicker than about 0.3 mm, to ensure that both the wires and collector strips can be fully embedded in said layer.

To make a laminated glazing having a built-in heating or alarm element, the preformed sheet containing the network of metal wires is then assembled with the transparent or translucent, laminated or solid substrate.

The sheet containing the electrical network can be assembled with the substrate by calendering, i.e., passing them between rollers exerting a pressure between one and several hundred newtons per linear centimeter. To improve adhesion between sheet and substrate, the substrate and/or sheet or even the rollers can be heated beforehand.

The glazing can also be assembled by using the process described in French Pat. No. 2,230,599, whereby the sheet is applied to the substrate by means of an inflatable membrane, the substrate being heated beforehand, if necessary.

To further improve the bond between sheet and substrate, the glazing can be subjected to autoclaving. For example, when the substrate surface to which the sheet is bonded is glass, the glazing can be subjected to a pressure of about 3 to 15 bars for about one hour at a temperature of about 100° to 140° C.

The manufacture of the glazing in accordance with the invention can generally be more easily achieved than that of prior art heated or alarm glazings having a polyvinylbutyral interlayer for which the autoclaving cycle is indispensable.

The manufacture of the sheet containing the network of electrical wires and the manufacture of the glazing using said sheet are preferably undertaken in a clean environment in which dust and other particles are kept to a minimum. The relative humidity of the environment should be kept at about 60% and the temperature between about 20°-25° C. Consequently, contamination of the sheet that may result in optical defects in the glazing can be practically eliminated.

Other features and advantages of the invention will become apparent from the following descriptions made with reference to the drawings.

EXAMPLE 1

A glazing with a built-in heating element, as shown in FIG. 1, is prepared. It comprises a solid substrate 1 made of silicate glass 4 mm in thickness and of a sheet of plastic material 2 comprising a first layer 3 of thermosetting polyurethane of the type described above having self-healing and antilacerative properties, and a second layer 4 of thermoplastic polyurethane having adhesive properties, in which a network of two clusters A and B of metal wires 5 is embedded. The wires are parallel to each other, arranged in a sinusoidal pattern and connected to the power supply by their ends 6.

The layer of thermosetting polyurethane has a thickness of about 0.5 mm whereas the layer of thermoplastic polyurethane has a thickness of about 0.05 mm.

The sheet is formed by casting. This can be accomplished by following the procedure described in Belgian Pat. No. 856,398.

A layer of cross-linked polyurethane having antilacerative properties is prepared by reaction of the following constitutents:

1,000 g of a polyether with a molecular weight of about 450 produced by condensation of 1,2-propylene oxide with 2,2-bis(hydroxymethyl-1-butanol) and with free OH group content of about 10.5 to 12%;

23 g of 2,6-di-tert-butyl-4-methylphenol;

0.5 g of dibutyltin dilaurate; and 1,000 g of a biuret of 1,6-hexamethylenediisocyanate with free NCO group content of 21 to 22%.

The mixture is degassed by agitation under reduced pressure to avoid formation of bubbles in the layer of polyurethane.

The above-described homogeneous monomer mixture is cast on a flat substrate by means of a casting head with doctor blade, for example, to form a layer about 0.5 mm in thickness. After the layer is polymerized, for example, by means of heat, a layer of adhesive, comprising primarily a linear thermoplastic polyurethane, is cast on the previously formed layer. This thermoplastic polyurethane can be produced by reaction of isocyanate with, for example, a polyester in a nitrogen environment. The polyester is prepared in a reactor by reaction of 145 parts adipic acid and 50 parts sebacic acid with 145 parts ε-caprolactone, 120 parts 2,2-dimethyl1,3-propanediol and 80 parts 1,4-butanediol in the presence of 25 parts xylene and 0.25 parts dibutyltin dilaurate at a temperature of 180° C. After distillation of 22.5 parts of reaction water from the mixture, 18 parts 1,4-butanediol and 400 parts xylol are added as chain lengthener. After the temperature is lowered to 80° C., 150 parts bis(4-isocyanatecyclohexyl)methane and 50 parts 3-isocyanatemethyl-3,5,5-trimethylcyclohexylisocyanate are added under vigorous agitation.

Once the temperature reaches 100° C., polymerization is continued until a thermoplastic polyurethane with a molecular weight of at least 40,000, and preferably higher than 50,000, is obtained. After lowering the temperature to about 70° C., the mixture is diluted with about 3,000 parts methylthylketone; then, at a temperature of about 30° C., it is again diluted with about 3,000 parts tetrahydrofuran to form a 10% solution by weight of polyurethane. Obviously, other thermoplastic polyurethanes or other thermoplastic substances, such as those described in Belgian Pat. No. 856,398 can be used in like fashion.

Using the casting head with doctor blade, the abovedescribed solution is cast on the previous prepared cross-linked polyurethane layer. After evaporation of the solvents, the thickness of the layer of adhesive is about 0.05 mm.

The two-ply sheet of plastic so obtained is then detached from the casting substrate.

After the sheet is cut approximately to the dimensions of the substrate, two bundles of tungsten wire, about 15 μm in diameter, with a resistance of 400 Ω/m, are arranged on the thermoplastic layer using the Therglas process. The spacing between wires is 1.9 mm, the sinusoidal factor k, i.e., the ratio of the actual length of the wire over the distance of the connecting points is 1.4. The active rectangular surface area covered by the heating element network is 150 mm long and 100 mm wide.

Once the network is embedded in the thermoplastic layer, the sheet and the glass substrate, heated beforehand at a temperature of about 50° C., are assembled by calendering. The glazing is then placed in an autoclave at a temperature of about 120° C. and a pressure of about 10 bars.

The glazing so formed can be supplied with direct or alternating current via ends 6 of wires 5. When the current is, for instance, 86 volts AC, the temperature on the exterior surface of the glazing, i.e., polyurethane side, measured by contact thermistor, is about 38° C. At 122 volts, the surface temperature reaches 52° C.

The glazing so formed is of excellent optical quality both at ambient temperature and when heated. No blurring occurs when the temperature is raised. Furthermore, the glazing so formed is highly wear-resistant and no delamination has been observed.

EXAMPLE 2

A glazing with built-in heating element is prepared from a 4 mm thick, solid substrate made of polycarbonate, such as Lexan marketed by General Electric, and a sheet of plastic, identical to that used in Example 1, containing a similar heating element network. The substrate and sheet are assembled by calendering, the polycarbonate substrate having been heated beforehand at a temperature of about 130° C. The pressure exerted by the calender rollers is about three newtons per linear centimeter. The glazing so obtained does not require autoclaving to prevent delamination.

The glazing so obtained is of good optical quality and is not affected by time or heating. Glazings of this type can be used to advantage as heated or alarm-type side window glazings for vehicles or buildings.

EXAMPLE 3

A glazing with built-in heating element is prepared from a 4 mm thick, solid substrate made of polymethylmethacrylate, such as Peterglas marketed by Peterlite, and a sheet of plastic, identical to that used in Example 1, containing a similar network of electrical wires for heating purposes.

The component parts are assembled by calendering the substrate, heated beforehand at a temperature of about 50° C., with the sheet so arranged that the thermoplastic layer containing the heating element network is in contact with the polymethylmethacrylate. The pressure exerted by the calender rolls is about three newtons per linear centimeter. The laminated product so obtained is then placed in an autoclave for about one hour at a pressure of about ten bars and a temperature of about 125° C.

The glazing so obtained is of good optical quality and is not affected by time or heating.

EXAMPLE 4

Figure 2:
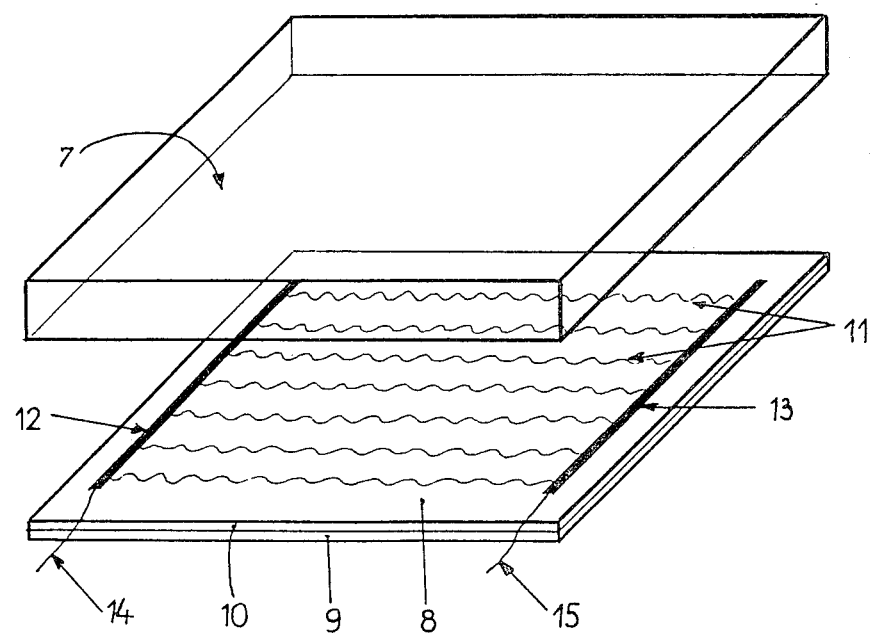

A glazing with a built-in heating element is shown in FIG. 2. It comprises a solid substrate 7 made of silicate glass 4 mm thick and a sheet of plastic material 8 about 0.5 mm thick, comprising a first layer of thermosetting polyurethane 9 with the self-healing and antilacerative properties described hereinabove, and a second layer of thermoplastic polyurethane 10, about 0.3 mm thick, with good adhesive properties, which adheres to the glass sheet and which contains a network of wires of sinusoidal configuration 11 parallel to each other between two busses 12 and 13 connected by connecting wires 14 and 15 to an outside source of current.

To achieve this, the sheet 8 is fabricated in accordance with the method of Example 1. After the sheet is cut approximately to the dimensions of the substrate, two metal collector strips are first embedded in the thermoplastic layer along opposite edges of the sheet. This is followed by the network of wires of sinusoidal configuration applied by the Therglas process. The ends of the wires and the two initial strips are covered with two identical collector strips. The wires are soldered to the collector strips. Then, as in Example 1, the substrate and the sheet containing the heating network are assembled by calendering, followed by autoclaving.

EXAMPLE 5

A glazing with a built-in heating element is made as described in Example 1, using as a substrate a conventional laminated glazing comprising two exterior sheets of glass, about 1 to 3 mm thick, and one sheet of polyvinylbutyral about 0.5 to 1 mm thick, sandwiched between the two sheets of glass.

The glass so obtained can be used as safety windshield with a built-in heating element.

In addition to the inherent safety features of the thermosetting layer, this glazing exhibits low heating inertia in comparison to the known prior art laminated glazings with built-in heating elements.

EXAMPLE 6

A glazing with a built-in heating element is prepared. It comprises a sheet of glass covered with a sheet of organosiloxane-polycarbonate copolymer, such as described in U.S. Pat. Nos. 3,189,662, 3,832,419 and 3,821,325, and a sheet of plastic material identical to the one used in Example 1 with a similar heating network covering the free surface of the copolymer mentioned above.

The method disclosed in Belgian Pat. No. 846,704 is used to make the substrate. This method involves a water-alcohol reaction product of an aminoalkyl polyalkoxysilane and an alkyl carbonate. Since the organosiloxane-polycarbonate copolymer is an energy absorber, the glazing can be used to advantage as a windshield with a built-in heating element.

What I claim is:

1. Laminated glazing comprising an interlayer of transparent or translucent thermoplastic material having a thickness of about 0.02 mm to about 0.3 mm and a network of one or more electrical wires embedded therein one surface of the interlayer being laminated onto a rigid substrate and the other surface being in contact with a layer of non-rigid antilacerative and self-healing plastic material, said layer being a surface layer with a thickness less than about 1 mm.

2. Glazing as in claim 1 wherein the layer of nonrigid antilacerative and self-healing plastic material is made of thermosetting polyurethane.

3. Glazing as in claim 1 or 2 wherein the thickness of the layer of nonrigid plastic material is between about 0.2 and 0.6 mm.

4. Glazing as in claim 1 or 2 wherein the interlayer containing the network of electrical wires is a thermoplastic polyurethane.

5. Glazing as in claim 1 wherein the substrate comprises a sheet of glass in contact with the interlayer.

6. Glazing as in claim 1 wherein the substrate comprises a sheet of rigid plastic material in contact with the interlayer.

7. Glazing as in claim 6 wherein the sheet of rigid plastic material is a polycarbonate.

8. Glazing as in claim 6 wherein the sheet of rigid plastic material is a polymethylmethacrylate.

9. Glazing as in claim 6 wherein the sheet of rigid plastic material is a polymer or copolymer formed from acrylonitrile or acrylic monomers.

* * * * *

United States Patent and Trademark Office

CERTIFICATE OF CORRECTION

PATENT NO. : 4,321,296
DATED : March 23, 1982
INVENTOR(S) : Gilles Rougier

It is certified that error appears in the above—identified patent and that said Letters Patent is hereby corrected as shown below:

<u>Column 4, line 39</u> after "glazing." insert, as the start of a new paragraph, --Thus, for example, when the glazing is used as a--.

Signed and Sealed this

First Day of June 1982

[SEAL]

Attest:

Attesting Officer

GERALD J. MOSSINGHOFF
Commissioner of Patents and Trademarks